Aug. 26, 1947.  L. E. NICHOLS  2,426,280
WELDING MACHINE
Filed Aug. 18, 1945  2 Sheets-Sheet 1
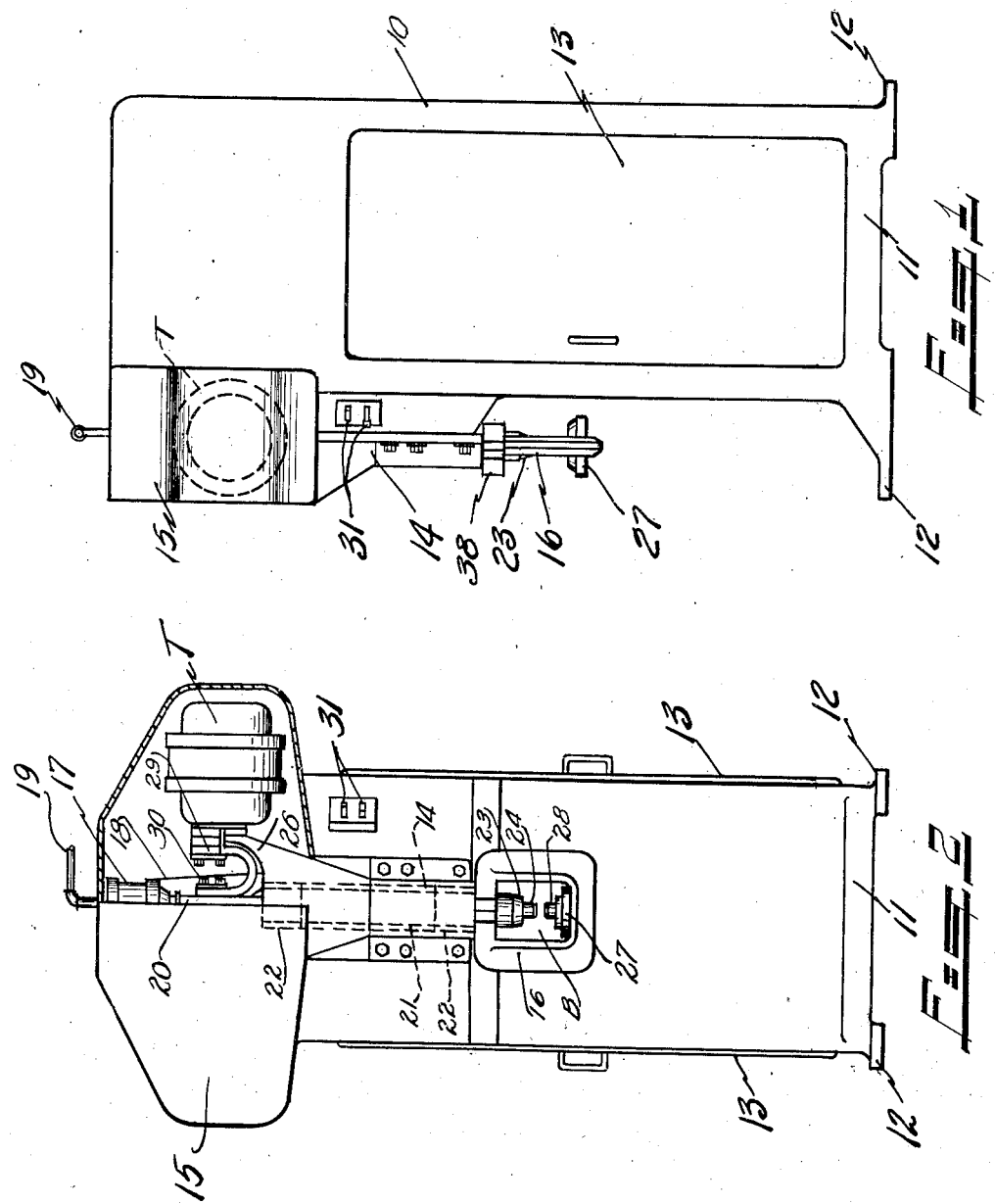
INVENTOR.
Leonard E. Nichols.
BY
Frank C. Fearman.
ATTORNEYS.

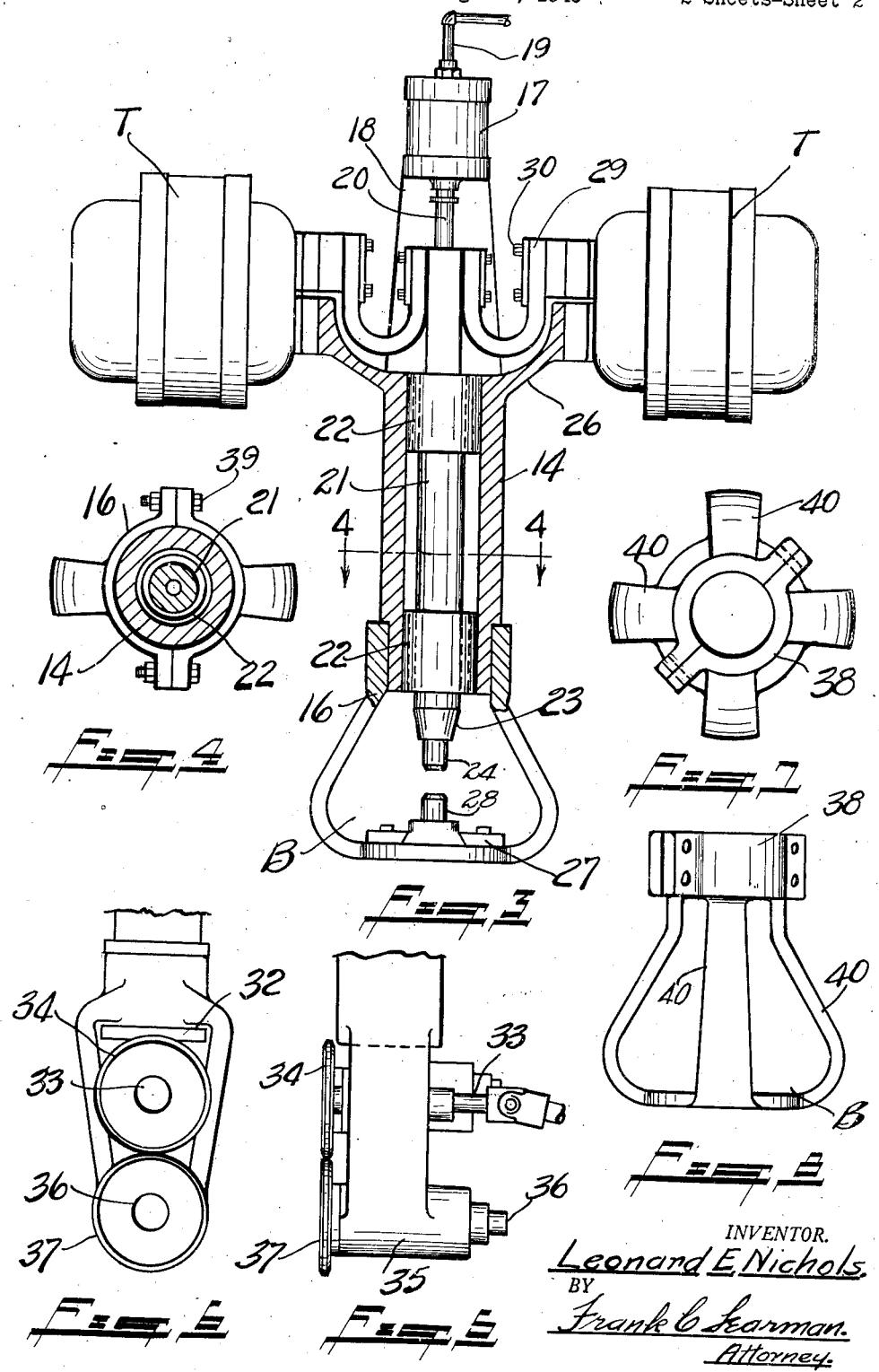

Patented Aug. 26, 1947

2,426,280

UNITED STATES PATENT OFFICE 2,426,280

WELDING MACHINE

Leonard E. Nichols, Birmingham, Mich., assignor to Resistance Welder Corporation, Bay City, Mich.

Application August 18, 1945, Serial No. 611,313

7 Claims. (Cl. 219—4)

This invention relates generally to resistance welding apparatus and refers more particularly to welding apparatus of the type provided with rolls or electrodes relatively movable into engagement with the work.

One of the salient objects of the invention is to design a welding machine in which the transformers and flexible laminations are so arranged as to form an even distribution of welding heat over the entire area of the "work" being welded.

Another object is to design a welder having concentric conductors which permit a maximum current output with a minimum current demand, and which also provides even balanced heat distribution on broad areas.

A further object is to provide a seam welder of simple, practical, and substantial design which can be easily manufactured and assembled, which is economical to operate, and in which the operating mechanism is readily accessible for repair/or maintenance.

Still a further object is to provide a welder having balanced conductors and equipment to the end that there will be no out of parallel deflection at dies, and in which the welding pressure is centered and evenly distributed on the work.

A further object still is to provide a welding machine including means for quick and easy interchangeability of work fixtures to suit work of various sizes and shapes.

Other objects of my invention will appear as the description proceeds.

To the accomplishment of the foregoing and related ends, said invention then consists of the means hereinafter fully described and particularly pointed out in the claims; the annexed drawings; the following description setting forth in detail certain means and one mode of carrying out the invention, such disclosed means and mode illustrating, however, but one of various ways in which the principle of the invention may be used.

In the drawings:

Fig. 1 is a side-elevational view of a welding machine embodying my invention.

Fig. 2 is a front-elevational view thereof, the housing being broken away to show the interior.

Fig. 3 is an enlarged, front-elevational sectional view showing the transformers, electrodes and associated mechanism.

Fig. 4 is an enlarged, transverse-sectional view taken on the line 4—4 of Fig. 3.

Fig. 5 is a fragmentary, side-elevational view showing the machine equipped with welding rolls.

Fig. 6 is a front-elevational view thereof.

Fig. 7 is a side-elevational view of a detachable fixture.

Fig. 8 is a top plan view thereof.

Referring now to the drawings in which I have shown one embodiment of my invention, the numeral 10 indicates a welding machine constructed in accordance with the present invention, this can be of any desired design, and in the present instance is formed with a base 11 equipped with brackets or feet 12 which can, if desired, be bolted to the floor or other support, the frame 10 serving as a housing in which all control mechanism is mounted and also serves as a pedestal for the welding unit proper. Doors 13 open into the housing 10 to facilitate access to the controls and the interior for assembly, repair or replacement.

The present invention is adaptable to any standard or special design welding machine, it can be utilized in a throat type, dial type or circular seam design which has minimum throat, and for the purpose of illustration, I have shown it embodied in a machine in which a ram housing 14 is mounted on the front of the machine, the upper end opening into a transformer housing 15 in which the transformers T are mounted, and a yoke fixture 16 is detachably secured to the lower end and is provided with an opening B to facilitate the insertion and/or removal of the "work" to be welded.

The machine can be either air, hydraulic or mechanically actuated, and in the instant design I have shown it air actuated, a pressure cylinder 17 being mounted on a suitable support 18 provided in the housing 15, and a pipe line 19 is connected to said cylinder and leads to any suitable source of air supply. A piston (not shown) is provided in the cylinder 17, and a piston rod 20 is connected thereto as usual, with its lower end connected to or formed integral with a combination center ram and conductor 21 which is in turn reciprocatingly mounted in insulated bearings 22, which bearings can be of conventional or anti-friction type as desired. A water-cooled die adapter 23 is provided on the lower end of this center ram 21 and carries an upper electrode 24 as usual, this die adapter and electrode projecting into the work opening B provided in the yoke fixture.

The ram housing 14 in reality forms the secondary of the machine, it can be ribbed if desired, for stiffening purposes, the upper end 26 forming the secondary terminal fixed connection.

The opening B provides for insertion and/or removal of the "work," and this opening can be of any reasonable required size to accommodate the work to be performed. The lower end of the fixture 16 forms the support for the lower die 27, and this fixture can be formed integral with or clamped to the transformer secondary as shown, the lower electrode 28 being mounted in the die 27 in the usual manner.

While in the present instance I have shown two transformers, it will be obvious that most machines will require but a single transformer, but any desired number may be utilized, depending on the nature of the work to be performed, these transformers being mounted in the housing 15 so that the secondary terminals can be arranged concentrically to lead downwardly to the lower electrode 28 as shown.

The flexible laminations 29 are connected to the center ram 21 by means of bolts 30 and serve as the conductor for the upper electrode, the opposite leg being connected to the transformers in the conventional manner.

Control buttons 31 are provided on the ram housing for starting and stopping the machine, and are located within easy reach of the operator.

The fact that the lower electrode and die are mounted in the fixture which is clamped to the secondary or ram housing eliminates any out of parallel deflection at dies, as there is no offset, the members being uniformly centered at all times.

In Figs. 5 and 6 of the drawings, I have shown the machine equipped with welding heads and rolls for seam welding and I do not deem it necessary to show or describe these in detail, as the principle is exactly the same, the center ram 21 having a welding head 32 on the lower end thereof and includes a shaft 33 on which the upper welding roll 34 is removably mounted, said shaft being driven in the conventional manner.

The lower end of the ram housing 14 can be offset to bring the welding rolls in substantially vertical alignment with the center ram, if desired, and the lower welding head 35 includes a shaft 36 on which the lower welding wheel 37 is mounted, the shaft 36 being driven from any convenient source of power.

In Figs. 7 and 8 of the drawings, I have shown a slightly different yoke fixture design, the upper end 38 being formed similar to a split collar, and bolts 39 are used to clamp it to one end of the ram housing 14, the lower end being ribbed as at 40 or otherwise formed to receive and accommodate the work to be performed, this design insuring an even distribution of current to the die.

The electrodes can be cooled in any desired conventional manner, either through the hollow center ram 21, through the fixture, or in any other desired manner.

From the foregoing, it will be clearly obvious that I have perfected a very simple, practical, and efficient welding machine, which can be economically constructed and assembled, and which permits maximum current output with a minimum current load.

What I claim is:

1. A resistance welding machine comprising a transformer, a combination center ram and conductor, an outer conductor connected to the transformer and arranged concentrically about said center ram and insulated therefrom, one of said conductors being mounted for reciprocal movement with relation to the other conductor, a "work" accommodating opening provided in the outer conductor, and pressure actuated means for reciprocating the center conductor.

2. A resistance welding machine comprising a transformer, a combination center ram and conductor, an outer conductor connected to said transformer and arranged concentrically about said center ram, bearings in said outer conductor and in which the center ram is reciprocatingly mounted, flexible means connecting said center ram and transformer, and electrodes carried by said conductors.

3. A resistance welding machine comprising a plurality of transformers, an elongated combination center ram and conductor flexibly connected thereto, an outer conductor connected to the transformers and arranged concentrically with relation to the center ram, a "work" receiving opening provided in the lower end of the outer conductor, a die mounted therein, electrodes detachably connected to said die and center ram respectively, and means for reciprocating said center ram with relation to the outer conductor.

4. A resistance welding machine comprising an elongated center ram and conductor, transformers flexibly connected to the upper end thereof, an outer conductor connected to said transformers and arranged concentrically about said center ram and provided with bearings in which the center ram is reciprocatingly mounted, means for insulating the center ram from the secondary, a "work" receiving opening in the lower end section of the outer conductor, a die mounted therein, a lower electrode mounted in said die, a die and upper electrode mounted on the lower end of the center ram, and means for reciprocating said center ram.

5. A resistance welding machine comprising an elongated combination center ram and conductor, transformers connected thereto, a combination outer secondary and die support arranged concentrically with relation to the center ram and provided with bearings in which the center ram is reciprocatingly mounted, a "work" accommodating opening adjacent the lower end of the outer secondary and into which the center ram projects, a die adapter connected thereto, an upper electrode detachably mounted in said die, a lower die and electrode mounted on said outer secondary within said opening and in vertical alignment with said upper electrode, and means for reciprocating said center ram.

6. A resistance welding machine comprising a transformer, a combination center ram and conductor having its upper end flexibly connected thereto, a combination outer secondary and die support arranged concentrically about said center ram, a "work" accommodating opening in said outer secondary, a lower electrode mounted in said die and in direct vertical alignment with the center ram, an upper die carried by the center ram, and means for reciprocating said center ram with relation to the outer secondary.

7. A resistance welding machine comprising a plurality of transformers, a combination center ram and conductor having its one end flexibly connected thereto, a combination die support and outer secondary connected to said transformers and arranged concentrically with relation to the center ram and in direct vertical alignment therewith, a "work" accommodating opening in said outer secondary and in which the die is mounted, bearings in said outer secondary and in which the center ram is reciprocatingly mounted, means for insulating the center ram from the outer secondary, a die adapter connected to the lower end of the center ram, electrodes mounted in the die adapters, and means for reciprocating said center ram.

LEONARD E. NICHOLS.

REFERENCES CITED

The following references are of record in the file of this patent:

UNITED STATES PATENTS

| Number | Name | Date |
|---|---|---|
| 1,176,762 | Lachman | Mar. 28, 1916 |
| 2,269,726 | Martin | Jan. 13, 1942 |
| 2,293,338 | Harris | Aug. 18, 1942 |
| 2,371,185 | Purat | Mar. 13, 1945 |
| 2,101,156 | Payne | Dec. 7, 1937 |
| 2,254,436 | Mallett | Sept. 2, 1941 |

FOREIGN PATENTS

| Number | Country | Date |
|---|---|---|
| 414,863 | Germany | June 8, 1925 |